United States Patent Office 3,447,769
Patented June 3, 1969

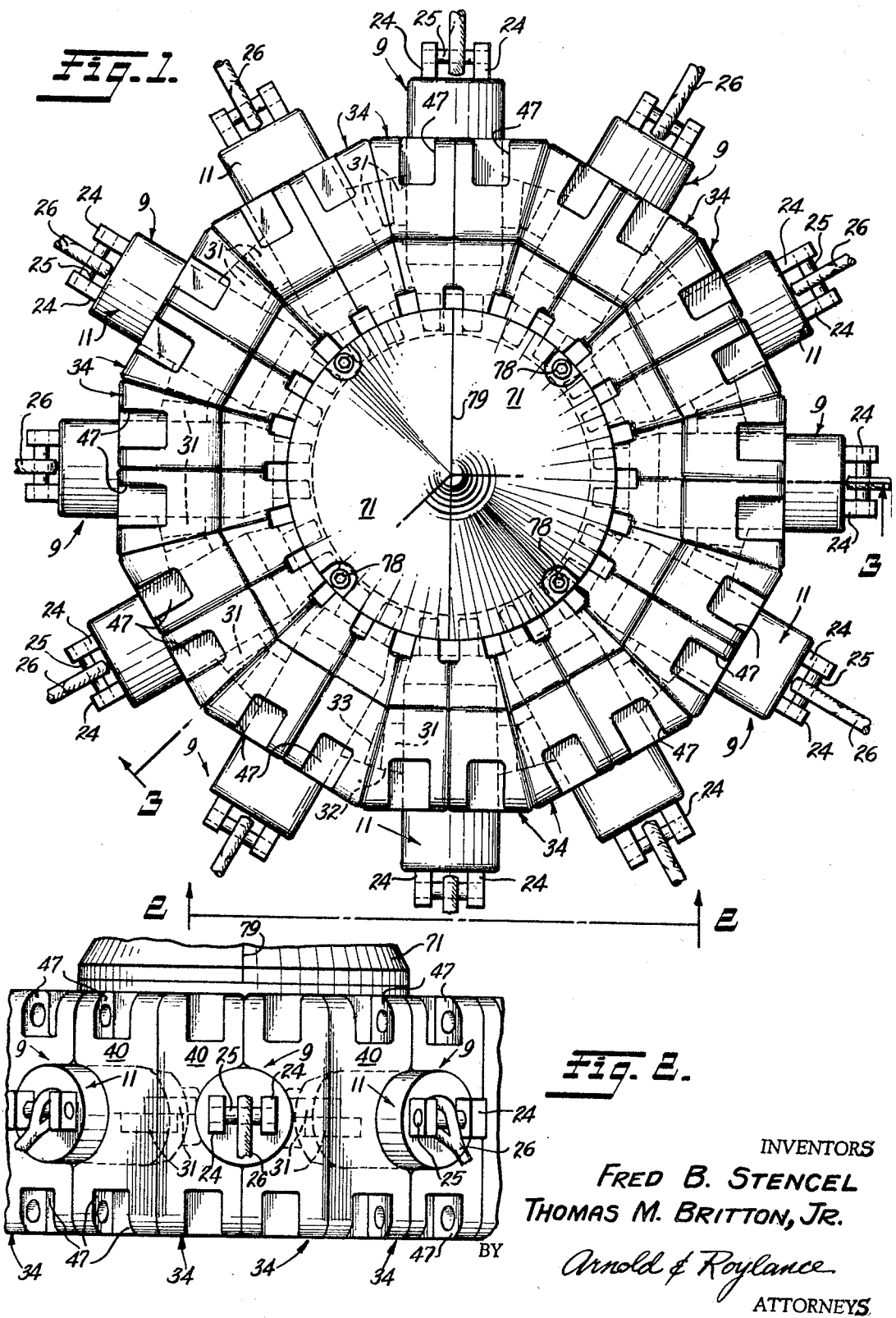

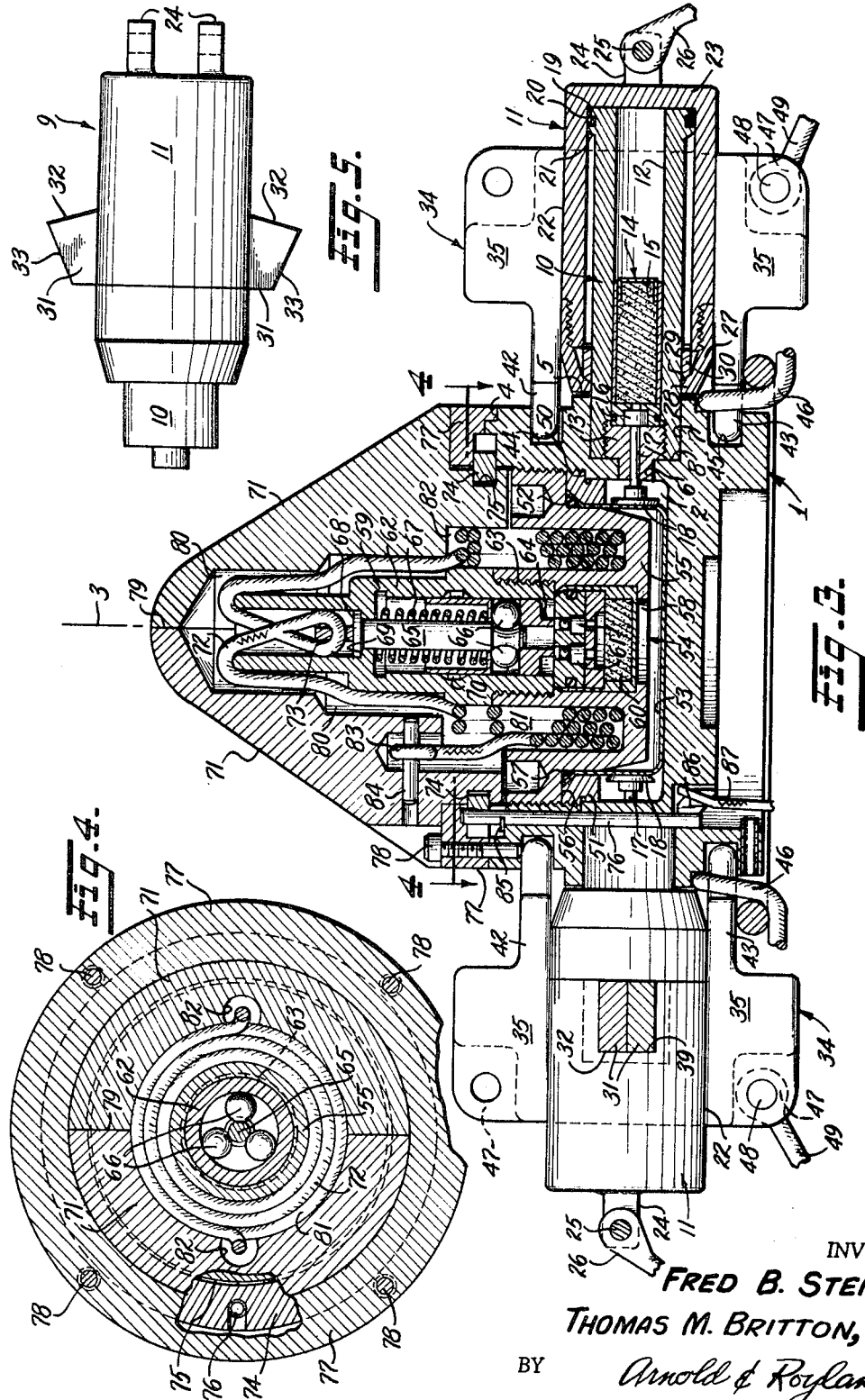

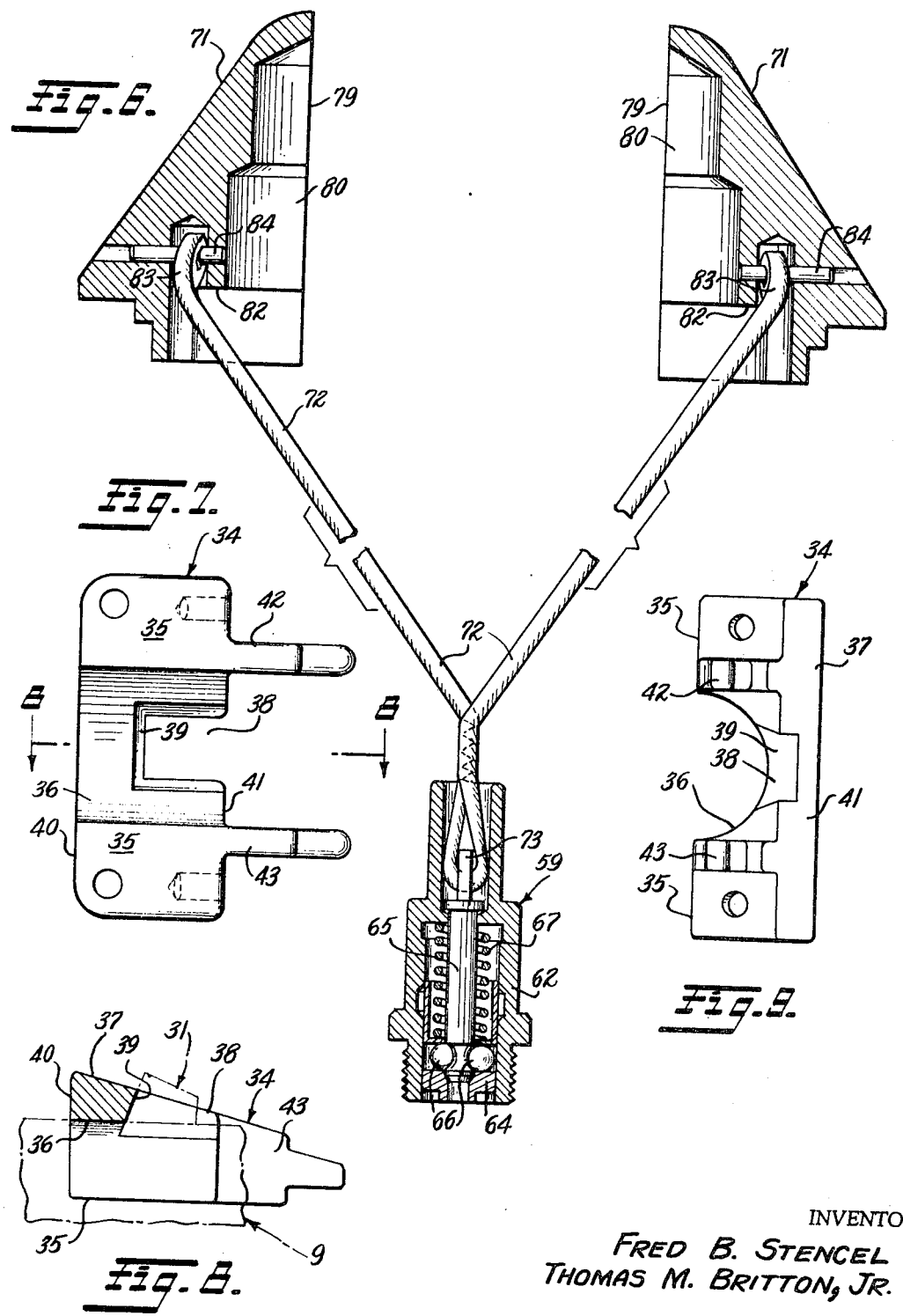

3,447,769
PARACHUTE SPREADING GUN
Fred B. Stencel and Thomas M. Britton, Jr., Asheville, N.C., assignors to Stencel Aero Engineering Corp., Arden, N.C., a corporation of North Carolina
Filed June 13, 1966, Ser. No. 556,994
Int. Cl. B64d 17/52, 17/62
U.S. Cl. 244—149
12 Claims

ABSTRACT OF THE DISCLOSURE

A compact gun device for spreading the canopy of a parachute, including a main or central body means and a plurality of telescoping drive assemblies disposed radially about the body means. Each telescoping drive assembly includes a generally cup-shaped outer or drive member slidably telescoped over a hollow tubular interior member. The interior cavities in the members of each drive assembly thus form an expansible chamber and a fluid pressure generating means, advantageously in the form of a pyrotechnic charge, communicates with each expansible chamber. When high fluid pressure enters the expansible chambers, it causes the volume thereof to increase, thus forcing the drive members radially outwardly from the main body. Projectiles are disposed radially about the main body and are attached to the drive members of the drive assemblies. Advantageously, a cooperating pair of such projectiles are attached to each individual drive member so that as the fluid pressure forces the drive members radially outwardly, the projectiles are likewise propelled radially outwardly, and since the projectiles are coupled to the canopy, such outward propelling of the projectiles serves to spread the canopy. Cooperating stop means are provided between the telescoping members of each drive assembly to limit the radially outward sliding of the drive members upon the interior members, and after the limit has been reached, the entire drive assembly separates from the main body to aid the projectiles in spreading the parachute canopy.

---

This invention relates to parachute apparatus and more particularly to improved parachute spreading guns capable of rapidly spreading parachute canopies of relatively large diameter.

Operational characteristics of present-day aircraft have posed severe requirements for parachute apparatus employed for recovery of personnel and other loads. Similarly, military and other needs for delivery of relatively large loads under circumstances where the delivering aircraft does not land have established a continuing demand for parachute improvement. In recent years, such requirements have led to adoption of fast acting parachute apparatus wherein the packed canopy is initially projected away from the load to pay out the suspension lines, as by a pyrotechnically operated projection gun such as that disclosed in U.S. Patent 2,957,664, issued Oct. 25, 1960, to Fred B. Stencel, the projected canopy then being rapidly spread, as by a pyrotechnically operated spreading gun of the type disclosed in U.S. Patent 2,953,333, issued Sept. 20, 1960, to Fred B. Stencel. In the application of such parachute apparatus to situations involving heavier loads, and therefore canopies of larger diameters on the order of 50–75 feet, problems have been encountered in providing a system of spreading projectiles adequate to accomplish high speed spreading of the canopy, yet capable of being accommodated in the relatively small space allowed for the spreading gun. Difficulties have also arisen in attempting to devise a spreading gun capable of satisfactorily projecting such a system of spreading projectiles.

A general object of this invention is to provide a parachute spreading gun suitable for spreading parachute canopies of relatively large diameter.

Another object is to devise a spreading gun, of the type which employs a plurality of radially fired spreading projectiles, which is so constructed that a larger number of projectiles can be employed without requiring a corresponding increase in the size of the device.

A further object is to provide a relatively compact canopy spreading gun wherein a plurality of power devices, such as pyrotechnic charges, act simultaneously to fire the spreading projectiles.

Considered broadly, the invention employs a plurality of drive assemblies disposed radially with respect to the body of the spreading gun and comprising telescopically associated elements which define an expansible chamber in such fashion that, when power is applied by generating fluid pressure in the expansible chamber, the outer element of the drive assembly is accelerated radially outwardly. A plurality of projectiles are used, advantageously arranged in pairs with each pair engaged over a different one of the drive assemblies in such fashion that, when the outer telescopic element of that assembly is accelerated outwardly, such movement is also imparted to the associated pair of projectiles. Stops are provided on the telescopic elements of the drive assemblies in such manner that the telescopic movement is limited and, when the limit is reached, the inertia of the outer telescopic element acts to carry the drive assembly radially away from the body of the gun, so that the drive assemblies as well as the projectiles can be attached to the canopy, as by suitable lines, to act as spreading elements. Each drive assembly is equipped with a pyrotechnic charge and a firing pin, the pin projecting inwardly of the gun and being exposed in an interior chamber provided in the gun body for accommodating a single pyrotechnic initiating charge. The initiating charge is disposed within a thin, deformable shell so arranged that, upon firing of the initiating charge, the shell is deformed outwardly to actuate all of the firing pins simultaneously and thus cause simultaneous operation of all of the drive assemblies.

In order that the manner in which the foregoing and other objects are attained in accordance with the invention can be understood in detail, one particularly advantageous embodiment thereof will be described with reference to the accompanying drawings, which form a part of this specification, and wherein:

FIG. 1 is an elevational view of a parachute spreading gun in accordance with the invention, the view being taken from the leading end of the spreading gun;

FIG. 2 is a fragmentary side elevational view taken generally on line 2—2, FIG. 1;

FIG. 3 is a longitudinal sectional view taken on line 3—3, FIG. 1;

FIG. 4 is a transverse sectional view taken on line 4—4, FIG. 3;

FIG. 5 is a side elevational view of one of the drive assemblies forming part of the device of FIG. 1;

FIG. 6 is an exploded view illustrating parts of the mechanism employed to fire the spreading gun of FIG. 1;

FIG. 7 is a side elevational view of one of the projectiles forming part of the device of FIG. 1;

FIG. 8 is a transverse sectional view taken on line 8—8, FIG. 7; and

FIG. 9 is an end elevational view of the projectile of FIG. 7, taken from the inner end thereof.

Turning now to the drawings in detail, the embodiment of the invention here illustrated comprises a main body 1 defining a cup-shaped interior chamber 2 which is concentric with the central axis 3 of the device and opens through the leading end 4 of the body. The outer periphery of body 1 is formed by an annular series of twelve flat surface portions 5, FIGS. 1 and 3, and the body is provided with twelve radial ports each including an inner cylindrical portion 6 of smaller diameter and an outer cylindrical portion 7 of larger diameter, the two portions being joined by a transverse shoulder 8, FIG. 3. The inner portions 6 open through the side wall of chamber 2. Outer portions 7 each open through a different one of the flat surface portion 5.

Removably associated with body 1 are twelve drive assemblies, one of which is indicated generally at 9, FIG. 5. As seen in FIG. 3, each drive assembly includes an elongated hollow inner cylindrical member 10 over which is telescopically and slidably engaged an elongated cylindrical drive member 11. Member 10 has a plain cylindrical bore 12 closed by a threaded plug 13, at the end of the member which is inwardly of the gun, the plug 13 having a cylindrical shank of an outer diameter such as to be tightly embraced by the inner portion 6 of one of the radial ports in body 1. At the outer end of member 10, bore 12 is open. The adjacent end of member 10 and plug 13 cooperate to present a flat face engaged with shoulder 8. An explosive cartridge 14 containing a suitable powder charge 15 is disposed in bore 12 and includes a peripherally flanged end portion having its flange clamped between plug 13 and a cooperating shoulder in bore 12. The flanged end portion of cartridge 14 accommodates a conventional primer 16. Plug 13 has a small diameter central bore which is aligned with primer 16 and slidably accommodates the shank of a firing pin 17. Pin 17 is significantly longer than the bore of plug 13, so as to extend into chamber 2, and includes a transversely enlarged head portion 18 presenting a flat surface facing toward the center of chamber 2.

Throughout most of its length, the outer cylindrical surface of member 10 has a diameter such as to be closely embraced by the outer portion 7 of one of the radial ports in body 1. At its outer end, member 10 has an outwardly projecting transverse annular portion 19 which is peripherally grooved to accommodate an O-ring 20 and which presents a frusto-conical shoulder 21 tapering inwardly and toward body 1. Drive member 11 includes an integral main body including a cylindrical tubular portion 22, of an inner diameter to slidably embrace portion 19 of member 10, and a transverse outer end wall 23 from which project a pair of transversely spaced ears 24, FIG. 5, which are apertured to accommodate a pin 25, FIG. 3, about which a line or tape 26 can be run to connect the drive assembly to the periphery of the parachute canopy (not shown). At its end opposite wall 23, tubular portion 22 is exteriorly threaded, and the member 11 is completed by an annular element 27 having interior threads engaged with the threaded end of portion 22. Element 27 tapers inwardly, terminating in a tip portion 28 which slidably embraces the outer surface of member 10 and which has a frusto-conical shoulder 29 directed toward and complementary to shoulder 21. A tubular cushioning ring 30, which can be of lead and has frusto-conical end faces tapering at the same angle as shoulders 21 and 29, is provided within element 27, the ring slidably embracing member 10 so as to be movable with member 11.

In each drive assembly 9, portion 22 of the drive member 11 is provided with a pair of laterally projecting integrally formed drive ears 31, FIGS. 2 and 5, which lie in a common plane parallel to but offset from the longitudinal axis of the drive assembly, by a distance equal to the thickness of the ears, the two drive ears projecting from member 11 in opposite directions. As will be clear from FIG. 2, adjacent pairs of members 11 are rotationally displaced from each other by 180°, so that the adjacent drive ears 31 can overlap each other with the overlapping portions in face-to-face engagement. Each ear 31 presents a driving face 32, FIG. 5, which slants outwardly and rearwardly, and the outer edge 33 of each ear slants inwardly and rearwardly.

The spreading gun employs twenty-four spreading projectiles 34, shown in detail in FIGS. 7–9. Each projectile 34 consists of an integral metal body having an inner surface which includes flat portions 35, which lie in a common plane, and a centrally located semicylindrical portion 36 disposed between portions 35 with the axis of portion 36 parallel to the plane of portions 35. The outer face 37 of each projectile 34 is flat and slants at an angle to the plane of portions 35. Surface portion 36 is of such diameter that the projectile can be engaged over any one of the drive assemblies 9 in such fashion that surface portion 36 snugly embraces the cylindrical outer surface of portion 22 of drive member 11. A rectangular notch 38 is provided in each projectile 34, being centered between surface portions 35, opening through the trailing end of the projectile, and presenting an abutment edge 39 which slants forwardly and inwardly at the same angle at which the driving faces 32 of ears 31 extend.

Two of the projectiles 34 are associated with each of the drive assemblies 9 and, when in properly assembled position, coact so that the surface portions 36 completely embrace the drive member 11, the surface portions 35 of the two projectiles are in flush engagement, and the ears 31 of drive member 11 are each accommodated by the notch 38 of a different one of the two projectiles, with the leading face 32 of each drive ear engaging the abutment edge 39 of the respective projectile. Under assembled conditions illustrated in FIGS. 1–3, the dimensions of the projectiles 34 and the angular disposition of the outer faces 37 are such that all of the projectiles 34 are in lateral contact, projectile to projectile. Thus, in addition to engagement of surface portions 35, there is flush engagement between the outer faces 37. Accordingly, the projectiles are, in effect, wedged together and therefore held in proper positions on the drive assemblies.

As will be clear from FIGS. 2 and 3, the width of notches 38 is approximately equal to twice the thickness of the drive ears 31 so that, when the projectiles are all assembled on the drive assemblies 9, each overlapping pair of ears 31 extends through and is slidably accommodated by the notches 38 of two adjacent ones of the projectiles 34.

Considering that the dimension between leading face 40 and trailing face 41 of the projectile 34 is the length, then the length of projectiles 34 is considerably less than the length of drive assemblies 9, so that the pins 25 of drive members 11 are exposed well in advance of the leading ends of the projectiles. Each projectile 34 includes a pair of projections 42, 43 extending rearwardly from trailing face 41, these projections being parallel to the central axis of the drive assembly 9 when the projectile is properly placed thereon and being of such length as to extend respectively into outwardly opening grooves 44, 45 in body 1 when the gun is fully assembled. The tips of projections 42, 43 are of reduced cross-sectional area. The tips of lower projections 43 serve to retain looped cords 46 which close the mouth of the canopy container (not shown) until the projectiles are moved outwardly to withdraw tips 43 from groove 45.

Each leading corner of each projectile 34 is notched to provide spaced portions 47 having aligned apertures to accommodate a pin 48 about which a cord or tape 49 can be looped for attachment of the projectile to the periphery of the canopy.

The side wall of chamber 2 is provided with an annular shoulder 50, FIG. 3, which faces toward leading end 4 of body 1 and supports a positioning ring 51 having an outwardly flaring inner surface portion 52. A cup-shaped cylindrical shell 53 of thin metal or other suitable distortable material is disposed in chamber 2. Shell 53 has a cylindrical side wall concentric with the side wall of chamber 2 but spaced inwardly therefrom, by reason of the thickness of ring 51. Head portions 18 of firing pins 17 engage the outer surface of the side wall of shell 53. The mouth of shell 53 flares outwardly and overlies the outwardly flaring surface portion 52 of ring 51.

The mouth of chamber 2 is threaded to cooperate with the exterior threads on a cylindrical closure member 54. Member 54 has a nose portion 55 of such diameter as to fit snugly within shell 53, the root of nose portion 55 joining a flat transverse annular shoulder 56 engaged with ring 51. An O-ring 57 is provided around the root of nose portion 55 to provide a fluid-tight seal between closure member 54 and the flared mouth portion of shell 53.

Closure member 54 has a central through bore 58 which accommodates a pyrotechnic initiator 59, FIG. 3, advantageously of the type disclosed in copending application Ser. No. 508,346 and now Patent No. 3,356,025, filed Nov. 17, 1965, by James W. Duncan. Initiator 59 includes powder charge 60, dual primers 61, and a generally cylindrical actuator housing 62 secured to closure member 54 by a threaded connection at 63. Housing 62 slidably encloses an annular striker 64 initially connected to a firing pin 65 by a plurality of detent balls 66, the combination of striker 64 and firing pin being resiliently urged toward primers 61 by a compression spring 67 but held in inactive position by engagement between a flange 68 on the firing pin with a cooperating stop shoulder 69 on housing 62. In the area occupied by spring 67, housing 62 has a transverse annular inwardly opening groove 70 of such dimensions that, when the combination of striker 64 and firing pin 65 is moved adequately in a direction compressing spring 67, detent balls 66 are allowed to move outwardly into groove 70 so that the striker is freed from the firing pin and is therefore actuated by spring 67 into firing engagement with both primers 61.

Firing of primers 61 ignites powder charge 60, the expanding combustion gas from the powder charge being effective to distort shell 53 outwardly. Since the side wall of shell 53 is of uniform thickness and all of the identical firing pins 17 are initially engaged therewith, deformation of the shell simultaneously operates all of firing pins 17 to fire the charges 15 of the drive assemblies 9.

In its preferred mode of use, the spreading gun is located at the leading end of a power projected canopy pack (not shown), in the general manner discussed in aforementioned U.S. Patent 2,957,664, and suitable means are provided to snub the canopy pack in its projected travel preparatory to spreading of the canopy. Operation of the initiator 59 is accomplished in response to such snubbing action, via inertia masses 71 connected to firing pin 65 by a cord 72 which is looped through an eye 73 at the end of the pin and has each of its ends secured to a different one of the masses 71.

The masses 71 are initially clamped together and secured to body 1 by two arcuate lock members 74, FIG. 3, each urged inwardly into respective outwardly opening transverse arcuate grooves 75 in masses 71 by pull pins 76. A ring 77 is secured to body 1, as by screws 78, and extends over lock members 74. The dimensions of lock members 74 are such that, when in the initial positions determined by pins 76, the lock members are engaged both in grooves 75 and beneath the inner portion of ring 77. In general form, the masses 71 each constitute one-half of a nose cone, with flat surfaces of the two masses engaged at 79 in a plane including axis 3. In each mass 71, there is an axially extending cavity 80 of semicylindrical shape, the two cavities 80 cooperating to accommodate initiator 59, there being sufficient space between the initiator and the wall of the cavity to accommodate cord 72. An annular well 81 is provided in closure member 54, the well opening forwardly and surrounding initiator 59. Masses 71 are cut away annularly at 82 to form a continuation of well 81. The greater portion of the length of cord 72 is stowed in well 81, each end portion 83 of the cord extending from the well and being looped about a pin 84 fixed to the respective one of the masses 71.

Pull pins 76 extend slidably through bores in body 1 which are parallel to axis 3. At their leading ends, pins 76 are engaged by shear members 85 which restrain the pins against rearward withdrawal. At their trailing ends, each pin 76 has a lateral projection 86 about which is looped a snubbing line 87, the other end of line 87 being secured to the structure (not shown) from which the canopy pack, including the spreading gun, is projected. The length of snubbing lines 87 is such that pins 76 are withdrawn from body 1 at an appropriate time during projected flight of the canopy pack, e.g., just before the canopy pack is snubbed. Withdrawal of pins 76 frees lock members 74 for escape from grooves 75. Accordingly, when the canopy pack is snubbed, masses 71 continue in projected travel, causing cord 72 to pay out until, as illustrated in FIG. 6, the cord becomes taut and the forward impetus of masses 71 is applied to firing pin 65 so that initiator 59 is operated to fire the spreading gun as hereinbefore described.

As will be understood from the foregoing description, firing of the initiator 59 effects ignition of the powder charge 60 to distort the shell 53 outwardly, thereby simultaneously operating the firing pins 17 in all of the drive assemblies 9. The firing pins 17, in turn, fire the charges 15 in each drive assembly to force the drive member 11 of each assembly to slide radially outwardly from the main body 1, such sliding occurring upon the interior members 10 of each drive assembly. As the drive members 11 are thus propelled outwardly, each pair of projectiles 34 mounted thereon are likewise propelled outwardly. As aforementioned, stops are provided to limit the untelescoping of the drive assembly members 10 and 11. These stops are formed by the outwardly directed shoulders 21 on the member 10 and the inwardly directed shoulders 29 on the member 11, with the slidable ring 30 being interposed therebetween. When the drive member 11 in each assembly untelescopes to a position where the ring 30 is sandwiched between the shoulders 21 and 29, the limit of telescoping movement is reached. Thereafter, the continuing high pressure force acting on the drive member 11 causes the entire drive assembly to separate from the main body 1 by withdrawing the shank of the plug 13 from the portion 6 and by withdrawing the inner end of the member 10 from the recess 7. The entire drive assembly 9 is thus radially propelled away from the main body 1 to thus aid the pair of projectiles 34 carried thereby in the spreading of the canopy. Specifically, the projectiles 34 are connected to the periphery of the canopy by lines 49 and the drive assemblies are connected to the periphery of the canopy by lines 26 and thus the radially outward movement of the projectiles and drive assemblies acts through all the lines 26 and 49 to spread the canopy.

Though one particularly advantageous embodiment of the invention has been chosen for illustrative purposes, it will be apparent that various changes and modifications can be made therein without departing from the scope of the invention.

What is claimed is:
1. In a parachute spreading gun, the combination comprising
   body means,
   a plurality of drive assemblies coupled with said body means;
   each of said drive assemblies including a pair of telescopically arranged elongated members one of which forms an exterior drive member and the other of which forms an interior member for mounting said drive member;
   each of said interior members including an elongated tubular member having an inner end disposed adjacent to, and coupled to, said body means, and having an outer end spaced radially away from said body means,
   said interior members each having a central bore extending axially therethrough between said inner ends and said outer ends, each of said exterior drive members having a generally elongated tubular cup-shaped configuration including a side wall means extending circumferentially about an interior member and an end wall means extending across the outer end of the interior member;

each exterior drive member and its associated interior member thus forming a telescoping arrangement in which said exterior drive member is slidably mounted upon said interior member and is movably axially outward thereon as said members untelescope;

said central bore in said interior member and the cavity defined by said cup-shaped exterior member forming an expansible chamber whose volume increases as said members untelescope, fluid pressure generating means communicating with said central bores within said interior members and hence communicating with said expansible chambers, said fluid pressure generating means being operative to establish high fluid pressures within said expansible chambers to thereby cause said drive members to move axially along their associated interior members and radially outwardly from said body means as the volume in said expansible chambers increases;

a plurality of projectiles disposed about said body means, each of said projectiles being at least operatively attached to a drive member;

each of said projectiles including a wall portion at least partially surrounding the side wall means on the associated drive member;

said projectiles including means enabling attachment of said projectiles to a parachute canopy;

said projectiles being projected outwardly concurrently with said drive members to effect spreading of said parachute canopy.

2. The combination defined in claim 1 wherein said interior members include an outwardly directed portion adjacent their outer ends and said exterior drive members include an inwardly directed portion on said side wall means, said inwardly and outwardly directed portions in each drive assembly serving as a stop means to limit the untelescoping of said members in each drive assembly.

3. The combination defined in claim 2 wherein the inner ends of said interior members are releasably coupled to said body means, whereby, when said inwardly and outwardly directed portions in each drive assembly operatively contact each other, said interior members are released from coupling with said body means and are themselves projected radially outwardly therefrom along with said projectile.

4. The combination defined in claim 1 wherein said projectiles each include at least one inwardly directed extension and wherein said body means includes recess means into which said extensions project when the members of said drive assemblies are fully telescoped.

5. The combination defined in claim 1 wherein said fluid pressure generating means comprises
a pyrotechnic charge,
initiator means for firing said charge including a firing pin,
at least one inertia mass,
means releasably retaining said mass on said body means, and
a firing line connected between said inertia mass and said firing pin.

6. In a parachute spreading gun, the combination of body means having a central axis;
a plurality of drive assemblies each comprising
an elongated hollow inner member open at one end, and
an elongated drive member telescopically and slidably embracing said inner member and closing the open end thereof, said inner member and drive member cooperating to define an expansible chamber,
said drive assemblies each being mounted on said body means and extending radially with respect thereto;
a plurality of projectiles each engaging an outer portion of one of said drive members,
said projectiles and the corresponding ones of said drive members having cooperating abutment means engaged against movement outwardly relative to said body means, whereby outward movement of said drive members imparts outward movement to said projectiles; and
power means operative to establish high fluid pressures in said hollow inner members of said drive assemblies substantially simultaneously to project said projectiles outwardly from said body means,
at least said projectiles having means whereby the same can be attached to a parachute canopy,
each of said drive members having at least two lateral projections, and
at least two of said projectiles being engaged with each of said drive members,
said lateral projections constituting part of said cooperating abutment means.

7. A parachute spreading gun according to claim 1, wherein
said drive members are cylindrical, and
each of said projectiles has a surface portion which is part of a cylindrical surface,
the ones of said projectiles which are associated with the same one of said drive members being arranged in surrounding relationship to such drive member and with said surface portions engaging the outer surface of the drive member,
each of said projectiles having a recess accommodating the corresponding one of said lateral projections and including a shoulder engaged therewith as part of said cooperating abutment means.

8. A parachute spreading gun according to claim 1, wherein
said drive members are longer than said projectiles,
the outer ends of said drive members project beyond said projectiles when said cooperating abutment means are engaged, and
the outer ends of said drive members are each provided with means for attachment to a parachute canopy.

9. In a parachute spreading gun, the combination of body means having a central axis;
a plurality of drive assemblies each comprising
an elongated hollow inner member open at one end, and
an elongated drive member telescopically and slidably embracing said inner member and closing the open end thereof, said inner member and drive member cooperating to define an expansible chamber,
said drive assemblies each being mounted on said body means and extending radially with respect thereto;
a plurality of projectiles each engaging an outer portion of one of said drive members,
said projectiles and the corresponding ones of said drive members having cooperating abutment means engaged against movement outwardly relative to said body means, whereby outward movement of said drive members imparts outward movement to said projectiles; and
power means operative to establish high fluid pressures in said hollow inner members of said drive assemblies substantially simultaneously to project said projectiles outwardly from said body means,
at least said projectiles having means whereby the same can be attached to a parachute canopy;
said body means having an interior chamber and a plurality of radial ports communicating with said chamber, said inner member of each of said drive assemblies having an end portion releasably engaged in a different one of said radial ports, said inner members and said body means having cooperating shoulder means engaged against movement of said inner members radially inwardly relative to said body means, said power means comprising
- a plurality of pyrotechnic charges each disposed in a different one of said inner members of said drive assemblies,
- a plurality of firing elements each operatively arranged to initiate a different one of said charges and extending into said interior chamber, and
- common means arranged in said interior chamber for simultaneously initiating all of said charges via said firing elements, each of said firing element sincluding a firing pin movable radially relative to said body means and having a head portion exposed in said interior chamber, said common means including
- a distortable shell disposed in said interior chamber, and
- a pyrotechnic charge disposed in said shell;

said head portions of said firing pins being outside of said shell, whereby initiation of said last-mentioned charge effects outward distortion of said shell and corresponding substantially simultaneous outward movement of said firing pins to initiate the charges disposed in the inner members of said drive assemblies.

10. A parachute spreading gun according to claim 9 wherein
said shell is generally cup-shaped and has a thin cylindrical side wall concentric with the central axis of said body means, and
said head portions of said firing pins are in at least close proximity to said cylindrical side wall of said shell.

11. In a parachute spreading gun, the combination of body means having a central axis;

a plurality of drive assemblies each comprising
- an elongated hollow inner member open at one end, and
- an elongated drive member telescopically and slidably embracing said inner member and closing the open end thereof, said inner member and drive member cooperating to define an expansible chamber, said drive assemblies each being mounted on said body means and extending radially with respect thereto;

a plurality of projectiles each engaging an outer portion of one of said drive members,
- said projectiles and the corresponding ones of said drive members having cooperating abutment means engaged against movement outwardly relative to said body means, whereby outward movement of said drive members imparts outward movement to said projectiles; and power means operative to establish high fluid pressures in said hollow inner members of said drive assemblies substantially simultaneously to project said projectiles outwardly from said body means, at least said projectiles having means whereby the same can be attached to a parachute canopy, each of said drive members having two oppositely extending lateral projections, said projectiles being arranged in cooperating pairs with each such pair being engaged with a different one of said lateral projections on said one drive member.

12. A parachute spreading gun according to claim 11, wherein
each of said projectiles tapers from its leading end to its trailing end,
said projectiles being arranged in a complete circular series with adjacent ones thereof in lateral engagement with each other.

References Cited

UNITED STATES PATENTS

| | | | |
|---|---|---|---|
| 1,081,137 | 12/1913 | Von Augezo | 244—147 |
| 1,279,224 | 9/1918 | Bates et al. | 102—5 |
| 1,310,693 | 7/1919 | Donnelly | 244—149 |
| 2,953,333 | 9/1960 | Stencel | 244—147 |
| 3,281,098 | 10/1966 | Stencel et al. | 244—149 |

MILTON BUCHLER, *Primary Examiner.*

RICHARD A. DORNON, *Assistant Examiner.*